US006316542B1

(12) United States Patent
Berger et al.

(10) Patent No.: US 6,316,542 B1
(45) Date of Patent: Nov. 13, 2001

(54) CROSSLINKABLE DIELECTRIC COMPOSITION

(75) Inventors: Noëlle Berger, Ecully; Pierre Jay, Saint Didier aux Monts d'Or, both of (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 08/650,544

(22) Filed: May 20, 1996

(30) Foreign Application Priority Data

May 19, 1995 (FR) .................................................. 95-05989

(51) Int. Cl.$^7$ ................................ C08K 5/01; C08K 5/10; C08K 5/11; C08K 5/12

(52) U.S. Cl. ................. 524/773; 252/182.2; 252/182.24; 252/570; 252/576; 524/775; 524/789; 524/791; 524/871; 524/873; 524/78; 528/48; 528/73; 528/75; 528/85; 528/485; 528/488; 528/490

(58) Field of Search ................................ 252/570, 182.2, 252/182.24, 576; 524/773, 775, 789, 791, 871, 873, 78; 528/48, 75, 73, 85, 490, 488, 485

(56) References Cited

U.S. PATENT DOCUMENTS

| 3,747,037 | * | 7/1973 | Earing | 523/173 |
| 4,008,197 | * | 2/1977 | Brauer et al. | 524/839 |
| 4,060,583 | | 11/1977 | Groves et al. | 264/272 |
| 4,176,239 | * | 11/1979 | Brauer et al. | 528/44 |
| 5,145,883 | * | 9/1992 | Saito et al. | 528/76 |
| 5,391,664 | * | 2/1995 | Takei et al. | 526/210 |
| 6,048,618 | * | 4/2000 | Berger et al. | 428/423.1 |

OTHER PUBLICATIONS

Japio Abstract, File 347, JP 59–191771, Oct. 30, 1984.
Derwent WPI, Week 8449 (Basic), JP 59191771, Oct. 30, 1984.
Oertel; *Polyurethane Handbook*: Chemistry—Raw Materials—Processing—Applications—Properties; Hanser Publishers; New York; 1985; pp. 12–15.*

* cited by examiner

*Primary Examiner*—Rabon Sergent
(74) *Attorney, Agent, or Firm*—Millen, White, Zelano & Branigan, P.C.

(57) ABSTRACT

The invention relates to a crosslinkable impregnating dielectric composition comprising a polydiene polyol, a polyisocyanate and a chemically inert liquid filler, (an insulating liquid) characterized in that a sufficient amount of the said liquid filler is used in order to maintain a viscosity of less than 50 mPa s at the impregnation temperature for a period at least equal to 1 day and in order to obtain a tans at 20° C. and at 50 Hz, after complete crosslinking, of less than 0.02. The invention also relates to a process for preparing the said composition.

43 Claims, 5 Drawing Sheets

CROSSLINKABLE DIELECTRIC COMPOSITION

BACKGROUND OF THE INVENTION

The invention relates to a crosslinkable dielectric composition based on polydiene polyol, a polyisocyanate and an inert liquid filler (an insulating liquid) which conserves, before crosslinking, a viscosity which is sufficiently low at a given temperature to allow its use, in particular, for impregnating solid dielectrics such as contained in condensers, cables and measuring transformers.

This composition, which is liquid during the impregnation, becomes an insulating solid after the crosslinking.

The invention also relates to a process for the preparation of the said composition.

The field of application relates most particularly to that of electrical appliances operating by AC or DC voltage and whose insulations are subjected to high electric fields, higher than 10 kV/mm.

For these appliances, one of the main functions of the impregnating liquids is the replacement of all of the air contained in the cavities of the solid insulants.

The presence of air in the solid insulants leads to partial discharges, resulting in the destruction of the dielectric and thus of the appliance.

In certain cases (high-voltage transformers and cables with circulating oil), the insulant also acts as a heat transfer fluid to remove the heat produced in the said appliances by the Joule effect.

However, liquid electric insulants have drawbacks such as the possibility of escaping from the appliances in the case of leaks, with the unfavourable consequences of the risk of the environment being polluted by the liquid and the breakdown of the electrical appliance.

They moreover have the drawback of having a lower breakdown voltage than the solid electric insulants.

Many attempts have been made to impregnate high-voltage insulations with solidifiable liquid systems for all electrical appliances for which the presence of a liquid is not essential in order to remove the heat.

However, these attempts have all been unsuccessful in the field of application concerned, that is to say high-voltage uses with high potential gradient.

As regards solidifiable liquids, two types of compounds have been proposed.

The first type consists of crystallizable organic liquids such as microcrystallized paraffin waxes. For the products of this type, although they possess good dielectric properties, shrinkages are still observed due to the crystallization, which result in the presence of cavities in the impregnated solid insulations.

The second type of solidifiable liquid consists of poly-condensable and/or crosslinkable 1- or 2- component systems, filled to a greater or lesser extent, in particular with an inert liquid in order to minimize the shrinkage.

Such systems are described in the Japanese patent application No. 61-197620 published on Sept. 1, 1986.

However, the dielectric properties of these products are mediocre, which prohibits their use in the field of application concerned, namely high-voltage insulations with high potential gradient.

In particular, the angle of loss or dielectric dissipation factor, hereinafter referred to as tangent delta (tan $\delta$), is too high.

Thus, in the abovementioned Japanese patent application, the tan $\delta$ of the products claimed is always higher than $5 \times 10^{-2}$ at 20° C., the standard temperature (JIS K-6911).

It may moreover b e noted in this application that the compositions claimed are intended for coating condenser bobbins.

SUMMARY OF THE INVENTION

A crosslinkable impregnating dielectric composition has now been found, this composition comprising at least one polydiene polyol, at least one polyisocyanate and at least one chemically inert liquid filler, characterized in that the functionality of the polyisocyanate is greater than or equal to 2 and preferably between 2.2 and 4, and in that the amount of the chemically inert liquid filler is greater than 90% by weight of the composition is used, in order to maintain a viscosity of less than 50 mPa s at the impregnation temperature for a period at least equal to 1 day and in order to obtain a tangent $\delta$ (tan $\delta$) at 20° C. and at 50 Hz, after complete crosslinking, of less than 0.02 and preferably of less than 0.01.

Now, the term impregnation temperature denotes the temperature to which the composition according to the invention is brought in order to impregnate a solid insulation such as a plastic film which can be used, in particular, in condensers.

This impregnation temperature, maintained for a period at least equal to 1 day, is equal to at least 20° C. and is preferably between 40° C. and 80° C.

According to the present invention, during the impregnation period defined above, the viscosity of the composition may change but must remain below about 50 mPa s.

According to the present invention, the amount of the chemically inert liquid filler is by weight greater than 90% and, preferably, between 92% and 96% of the composition.

According to the present invention, the chemically inert liquid filler is an insulating liquid, which may fully solubilize the polydiene polyols and the polyisocyanates, and which is chosen from alkylbenzenes such as decylbenzenes and dodecylbenzenes; dielectric esters which are, for example, products of reaction of polyvalent alcohols such as pentaerythritol with monovalent carboxylic acids such as n-heptanoic acid; alkyl phthalates such as dibutyl phthalate and dioctyl phthalate; alkylpolyaromatic compounds such as monoisopropylbiphenyl (MIPB) and phenylxylylethanes (PXE); mixtures of benzyltoluenes and benzyl-benzyltoluenes such as those described, in particular, in European patent No. 136,230; mixtures of mono- and bis (methylbenzyl)xylenes such as those described in European patent application No. 0,443,899; mixtures of benzyltoluene and diphenylethane; dielectric plant oils such as rapeseed oils and corn oils, as well as a combination of at least two of the insulating liquids mentioned above.

Mixtures of benzyltoluenes and benzyl-benzyltoluenes comprising from 50% to 90% by weight of benzyltoluenes (mixture of the o, m and p isomers) and from 50% to 10% by weight of benzyl-benzyltoluenes, dielectric esters such as dibutyl sebacate and dioctyl adipate, alkyl phthalates such as dioctyl phthalate or dielectric plant oils such as rapeseed oil will preferably be used as the chemically inert liquid filler.

According to the present invention, the chemically inert liquid filler has a viscosity at 20° C. of not more than 100 mPa 8 and preferably of between 4 and 30 mPa s, measured according to ASTM standard D445.

According to the present invention, the polyisocyanate used may be chosen from aromatic, aliphatic and cycloaliphatic polyisocyanates and those which contain an isocyanurate ring in their molecule, having at least two isocyanate functions in their molecule, which are capable of reacting with hydroxyl functions of a polyol in order to form a three-dimensional polyurethane network resulting in gelation of the composition.

As illustrations of aromatic polyisocy-anates which can be used according to the present invention, mention will be made of 4,4'-diphenylmethane diisocyanate (MDI), polymeric MDIs and triphenylmethane triisocyanate.

As an illustration of an aliphatic polyisocyanate which can be used according to the present invention, mention will be made of 1,6-diisocyanatohexane biuret As illustrations of cycloaliphatic polyisocyanates, mention will be made of isophorone diisocyanate (IPDI), cyclohexyl diisocyanate (CHDI) and 4,4'-dicyclohexylmethane diisocyanate.

As illustrations of polyisocyanates which contain the isocyanurate ring in their molecule, mention will be made of the hexamethylene diisocyanate trimers marketed by the company Rhône-Poulenc under the name Tolonate HDT and tris [1-(isocyanotomethyl)-1,3,3-trimethylcyclohexane] isocyanurate marketed by the company Hüls under the name Vestanat T 1890/100.

The amount of polyisocyanate according to the present invention is chosen such that the NCO/OH molar ratio is about 1 and preferably between 0.85 and 1.15.

According to the present invention, the polydiene polyol is a hydroxytelechelic conjugated diene oligomer which may be obtained by various processes, such as radical polymerization of conjugated diene having from 4 to 20 carbon atoms, in the presence of a polymerization initiator such as hydrogen peroxide or an azo compound such as azo-2,2-bis [2-methyl-N-(2-hydroxyethyl)propionamide] or the anionic polymerization of conjugated diene having from 4 to 20 carbon atoms in the presence of a catalyst such as naphthalenedilithium.

According to the present invention, the conjugated diene of the polydiene polyol is chosen from the group comprising butadiene, isoprene, chloroprene, 1,3-pentadiene and cyclopentadiene.

It would not be departing from the scope of the invention if hydroxytelechelic oligomers of conjugated dienes epoxidized on the chain and hydrogenated hydroxytelechelic oligomers of conjugated dienes were used.

According to the present invention, the polydiene polyols may have number-average molar masses of not more than 7000 and preferably of between 1000 and 3000. They have functionalities ranging from 1 to 5 and preferably ranging from 1.8 to 3 and a dynamic viscosity, measured at 30° C., at least equal to 600 mPa s.

As an illustration of polydiene polyols, mention will be made of the hydroxylated polybutadienes marketed by the company Elf Atochem S.A. under the names Poly Bd® 45 HT and Poly Bd® 20 LM.

According to the present invention, the dielectric composition may comprise, in addition to the polydiene polyol, one or more polyols of low molar mass.

The expression polyol of low molar mass is understood to refer to polyols having molar masses ranging from 50 to 800.

As illustrations of such polyols, mention may be made of ethylene glycol, propylene glycol, diethylene glycol, dipropylene glycol, polyether polyols, butane-1,4-diol, hexane-1, 6-diol, 2-ethyl-hexane-1,3-diol, N,N-bis(2-hydroxypropyl) aniline, 3-methyl-1,5-pentanediol, trimethylol propane, pentaerythritol, propoxylated bisphenol A marketed by the company Akzo under the name Dianol 320 and a mixture of at least two abovementioned polyols.

In the event that a polyol of low molar mass is used, the NCO/OH molar ratio will have to be calculated bearing in mind the hydroxyl functions provided by the said polyol of low molar mass.

Although the use of a catalyst is not essential, one may be used in certain cases, if so desired, which catalyst may be chosen from the group comprising tertiary amines, imidazoles and organometallic compounds.

As illustrations of tertiary amines, mention may be made of 1,4-diazabicyclo [2.2.2]octane(DABCO) and N,N,N',N", N"-pentamethyldiethylenetriamine.

As illustrations of organometallic compounds, mention may be made of dibutyltin dilaurate, dibutyltin acetate and organobismuth derivatives.

The crosslinkable composition of the present invention may be prepared by mixing, at room temperature (about 20° C.), various constituents by any means of stirring which is sufficient to ensure good dispersion of the constituents.

However, the inventors have observed that by working in this manner, compositions were obtained which, although admittedly were crosslinkable and had viscosities at the time of impregnation which were in accordance with those claimed in the present invention, they had mediocre dielectric properties in certain cases, in particular high tan δ values.

In the case where the dielectric properties proved to be mediocre, the inventors have found a process for the preparation of the composition according to the present invention, characterized by the preparation, firstly and separately, of a mixture A, by dissolving one or more polyols in a chemically inert liquid filler, and a mixture B by dissolving one or more polyisocyanates in a chemically inert liquid filler, then followed by the placing in contact, separately, of each of the mixtures A and/or B obtained with an adsorbent earth at a temperature of between 20° C. and 80° C.

This placing in contact may take place in two different ways.

According to a first way of working, the adsorbent earth is added to the mixtures A and/or B, the mixtures A and/or B containing the said adsorbent earth are stirred separately for a period at least equal to one hour and the said adsorbent earth is then removed from the mixtures A and/or B. In this way of working, the adsorbent earth is used, in the mixtures A and/or B, in a proportion of 0.1 to 5 parts by weight, and preferably of 1 to 3 parts by weight, per 100 parts by weight of mixture.

According to the present invention, identical or different amounts of adsorbent earth may be added to the mixtures A and/or B.

The adsorbent earth is removed from the mixtures A and/or B by means known to those skilled in the art, namely filtration or centrifugation.

A second way of working consists in circulating the mixtures A and/or B in separate columns packed with adsorbent earth of suitable particle size.

In either variant of the process, the weight amounts of chemically inert liquid filler in the mixtures A and/or B may be at least equal to 40% and preferably between 85% and 99.5% of the mixtures A and/or B.

As illustrations of adsorbent earths which can be used according to the present invention mention will be made of Fuller's earth, bentonites, diatomaceous earths, attapulgite and activated silica.

The efficiency of these processes may be evaluated by measuring the tan δ of the liquid at 20° C. and at 50 Hz.

It would not constitute departure from the scope of the invention if the process was repeated separately one or more times on either of the mixtures A and B or on both mixtures until a level of dielectric properties which is acceptable for the use envisaged was obtained.

As regards the mixture B, the inventors have observed that the content of isocyanate function was virtually retained.

In order to prepare the dielectric composition according to the invention, the treated or untreated mixtures A and B are placed in contact by either variant of the process, partially or totally, optionally with complementary addition of pure chemically inert liquid filler.

This placing in contact may be performed by any means of mixing which makes it possible to ensure good homogenization.

The mixtures A and B may also contain one or more additives such as antioxidants, epoxides, anthraquinone and derivatives.

A person skilled in the art will determine the weight amounts of the mixtures A and B, as well as the amounts optionally added of pure chemically inert liquid filler, to be placed in contact during the preparation of the said composition so as to obtain a final composition comprising at least 90% by weight of chemically inert liquid filler and an NCO/OH molar ratio of between 0.85 and 1.15.

The composition obtained according to the process of the invention can be used in particular as agent for impregnating the solid insulations contained in electrical appliances (condensers, transformers and high-voltage cables).

The placing in contact of the composition and the substrate to be impregnated is carried out at a temperature of between 20° C. and 90° C., generally wider reduced pressure in a first step and then at atmospheric pressure.

When the impregnation has ended, the temperature may be raised to 100° C., or even higher, for a short period in order to improve the crosslinking and to obtain a solid product.

The composition according to the invention has the advantage of leading to insulations possessing an improved lifetime and better breakdown resistance.

The composition also has a low tan δ value, of less than 0.02 measured at 20° C. and at 50 Hz, and high breakdown voltages.

The examples which follow illustrate the invention.

The compositions were prepared using the following constituents:

PolyBd® 45 HT (referred to hereinbelow as PolyBd): hydroxylated polybutadiene of Mn equal to 2800 (determined by steric exclusion chromatography), having a hydroxyl number $I_{OH}$, expressed in milliecuivalents per gram (meq/g), equal to 0.83, a viscosity equal to 5000 mPa s at 30° C. and a density equal to 0.90, Jarylec C 100 marketed by the company Elf Atochem S. A. (referred to hereinbelow as Jarylec): chemically inert liquid filler consisting of 75% by weight of benzyltoluenes and 25% by weight of benzylbenzyltoluenes, having a viscosity at 20° C. of 6.5 mPa s measured according to ASTM standard D-445, dioctyl phthalate marketed by the company Elf Atochem (referred to hereinbelow as DOP): chemically inert liquid filler consisting of diethylhexyl ortho-phthalate, having a viscosity at 20° C. equal to 80 mPa s, dibutyl sebacate (referred to hereinbelow as DBS): having a viscosity at 20° C. equal to 9.3 mPa s, dodecylbenzene (referred to hereinbelow as DDB): having a viscosity at 20° C. equal to 10.4 mPa s, food-grade rapeseed oil having a viscosity at 20° C. equal to 69.5 mPa s, Tolonate HDT/LV (referred to hereinbelow as Tolonate): tris(6-isocyanatohexyl)isocyanurate, having an NCO content equal to 23%, a functionality of about 3.4 and a viscosity at 25° C. equal to 1200 (+/− 300) mPa s, Voranol CP 455 marketed by the company Dow Chemical (referred to hereinbelow as Voranol): polyether polyol of molar mass equal to 450, having an $I_{OH}$ equal to 6.77 meq/g and a viscosity at 25° C. equal to 330 mPa s, Isonate M 143 (referred to hereinbelow as Isonate) marketed by the company Dow Chemical: polymeric MDI having an NCO content equal to 30%, a functionality equal to 2.2 and a viscosity at 20° C. equal to 130 mPa s, adsorbent earth: attapulgite preactivated at 150° C.

Preparation of the Compositions According to the Process of the Invention

Either PolyBd or a mixture of PolyBd and Voranol in proportions of 92.25% by weight of PolyBd to 7.75% by weight of Voranol (mixtures A), on the one hand, and either Isonate or Tolonate (mixtures B), on the other hand, are dissolved separately in Jarylec.

The proportions of the various constituents are reported in Table 1.

3 g of attapulgite per 100 g of mixture are added to each of the mixtures A and B, the mixtures are then stirred separately at room temperature (about 20° C.) for 3 to 18 hours and they are then filtered under reduced pressure in order to remove the attapulgite.

The tan δ at 20° C. and at 50 Hz is measured on each of the mixtures A and B before and after treatment with attapulgite.

The results are reported in Table 1.

TABLE 1

| | COMPOSITION (% by weight) | | Tan δ (20° C./50 Hz) | |
|---|---|---|---|---|
| | | | Before treatment | After treatment |
| A1 | Jarylec | 88 | $8.3 \times 10^{-3}$ | $1.2 \times 10^{-3}$ |
| | PolyBd + Voranol | 12 | | |
| A2 | Jarylec | 79 | $8.7 \times 10^{-3}$ | $0.23 \times 10^{-3}$ |
| | PolyBd + Voranol | 21 | | |
| A3 | Jarylec | 84 | $3 \times 10^{-4}$ | $1.2 \times 10^{-4}$ |
| | PolyBd | 16 | | |
| B1 | Jarylec | 96 | $27.8 \times 10^{-3}$ | $0.5 \times 10^{-3}$ |
| | Isonate | 4 | | |
| B2 | Jarylec | 87.2 | $3.7 \times 10^{-3}$ | $3.4 \times 10^{-3}$ |
| | Tolonate | 12.8 | | |
| B3 | Jarylec | 86.5 | $34 \times 10^{-3}$ | $14 \times 10^{-3}$ |
| | Tolonate | 13.5 | | |

The composition B3 undergoes a second treatment on attapulgite under conditions identical to the first treatment. It is observed that the tan δ is equal to $0.4 \times 10^{-3}$ (20° C./50 Hz).

The NCO contents were monitored before and after treatment and it is observed that they are virtually identical.

Next, the mixtures A and B are placed in contact in a glass reactor fitted with a stirrer.

BRIEF DESCRIPTION OF THE DRAWINGS

The attached drawings are graphs of vaiables relating to above composition and graphs of condenser lifetimes.

FIG. 4 at 390 V/μm DC and FIG. 5 at 350 V/μm DC.

DETAILED DESCRIPTION OF THE DRAWINGS

Influence of the Jarylec Content on the Chanae in Viscosity

Compositions are prepared by placing in contact mixtures A1 or A2 with the mixture B1 so as to obtain an NCO/OH molar ratio equal to 0.915 and weight amounts of Jarylec in the compositions equal to 85%, 90% (compositions not in accordance with the invention), 92% and 94%, then the compositions are left at room temperature and the viscosity is recorded as a function of time.

Figure 1:
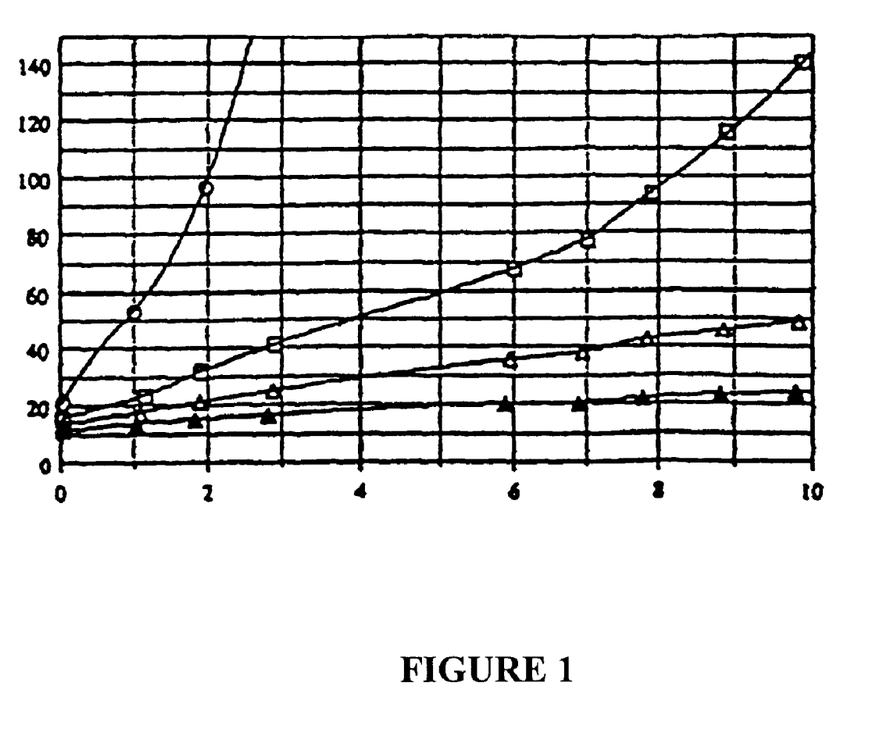
FIG. 1 shows the influence of the content of chemically inert liquid filler (Jarylec) on the change in viscosity.

The results are reported in the graph of FIG. 1.

In this graph, the viscosity of the compositions in mPa s has been represented on the y-axis and the time in days on the x-axis.

In this graph also, the symbols have the following meanings:

-o- the composition containing 85% by weight of Jarylec,
-□- the composition containing 90% by weight of Jarylec,
-Δ- the composition containing 92% by weight of Jarylec,
-▲- the composition containing 94% by weight of Jarylec.

The change in viscosity of a composition obtained by placing in contact mixtures A3 and B2 so as to obtain an NCO/OH molar ratio equal to 0.95 and a weight content of Jarylec equal to 94% was studied at various temperatures.

This composition consists of:
94% of Jarylec,
5.2% of PolyBd and
0.8% of Tolonate.

Figure 2:
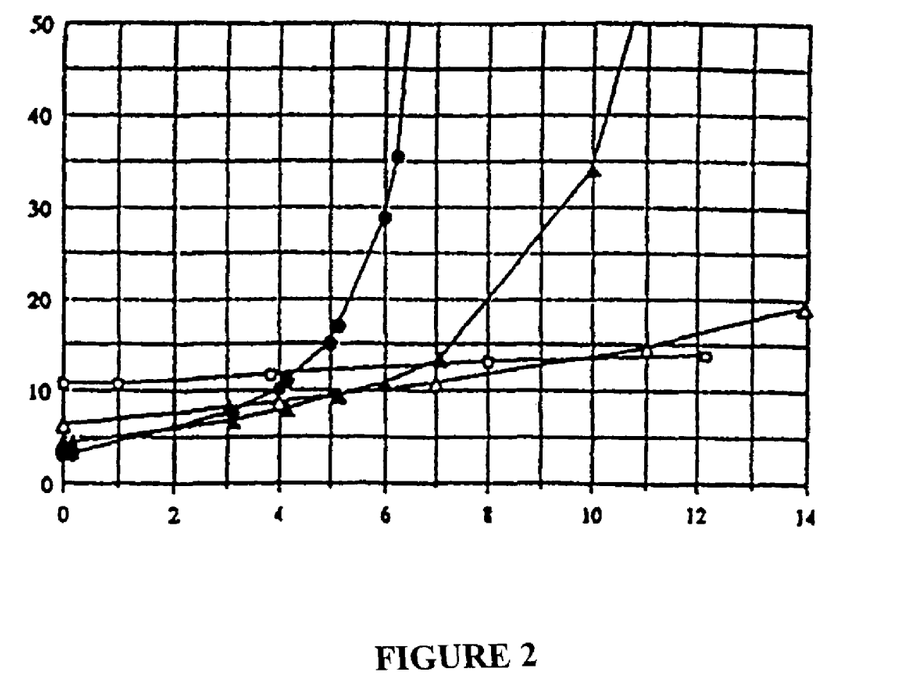
FIG. 2 shows the influence of the impregnating temperature on the change in viscosity.

The change in viscosity of this composition as a function of time at various temperatures is reported in the graph of FIG. 2. In this graph, the viscosity in mPa s is represented on the y-axis and the time in days on the x-axis.

In this graph also, the symbols have the following meanings:

-□- the change at 20° C. in viscosity as a function of time,
-Δ- the change at 40° C. in viscosity as a function of time,
-▲- the change at 60° C. in viscosity as a function of time,
-•- the change at 80° C. in viscosity as a function of time, The above composition (94% of Jarylec, 5.2% of PolyBd and 0.8% of Tolonate) was poured in to a leaktight tan δ cell and then placed in an oven at 100° C. and maintained at this temperature for 100 days.

The tan δ values were measured periodically in the course of the residence time at 100° C.

Figure 3:
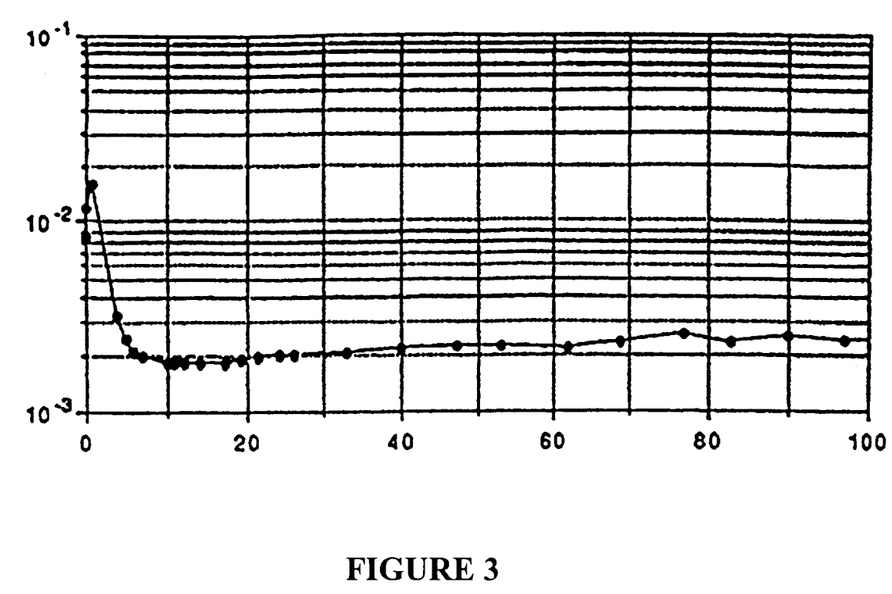
FIG. 3 shows the dielectric qualities of these compositions, by measuring the tan δ and the breakdown voltage.

The results are reported in the graph of FIG. 3.

In this graph, the tan δ at 100° C. is represented on the y-axis and the time in days on the x-axis.

After one week at 100° C., which corresponds to the time for formation of the gel, the tan δ stabilizes at a very low value, below the values specified for a new insulating oil. This value is stable over time at a temperature of 100° C.

A composition is prepared by placing in contact mixtures A1 and B1 so as to obtain an NCO/OR molar ratio equal to 0.91 and a Jarylec content equal to 92%.

This composition consists of:
92% by weight of Jarylec,
6.3% by weight of PolyBd,
0.5% by weight of Voranol and
1.2% by weight of Isonate.

This composition is poured into three cells, with spherical electrodes spaced 1 mm apart, in order to measure the breakdown voltage. The three cells are then placed at 80° C. for 8 days for crosslinking. After cooling to room temperature, the breakdown voltage over an AC voltage gradient is measured according to IEC standard 156.

Breakdown voltage measurements, carried out under the same conditions, are made using the insulating liquids: Univolt 52 mineral oil and Jarylec, previously degassed and filtered on a Millipore filter of porosity less than 1 mm.

The average values of the breakdown voltage results for the gel and the two insulating liquids are as follows:

| Composition according to the invention | 95.2 kV |
|---|---|
| Univolt 52 mineral oil | 40.0 kV |
| Jarylec | 44.5 kV |

It is seen that the breakdown voltage between spherical electrodes spaced 1 mm apart is more than 2 times higher for the composition according to the invention than for those obtained with the best insulating liquids used for transformers (mineral oil) and for condensers (Jarylec).

Compositions according to the invention containing chemically inert liquid fillers other than Jarylec:

A composition is prepared containing DOP as liquid filler. 8.30 g of Tolonate are mixed, under a nitrogen atmosphere, with 940 g of DOP pretreated on attapulgite. 51.7 g of PolyBd and 3 mg/kg of dibutyltin dilaurate, referred to hereinbelow as DBTL, are then added. The composition thus obtained contains 94% of DOP and the NCO/OH molar ratio is 1.0.

The viscosity at 60° C. is determined on a portion of this composition. The viscosity goes from 20 mPa s to 75 mPa s over 6 days. After 10 days at 90° C., the composition is totally crosslinked.

Another portion of the composition is placed in a leaktight cell for measuring the dissipation factor. After 8 days at 90° C. and cooling, the tan δ at 20° C. - 50 Hz of the gel obtained is measured. A tan δ=0.0031 is found.

A composition is prepared containing a mixture of DDB and DOP as liquid filler, in a proportion of 80% of DDB and 20% of DOP. 8.41 g of Tolonate are mixed, under a nitrogen atmosphere, with 939.2 g of the mixture DDB+DOP. 52.4 g of PolyBd and 3 mg/kg of DBTL are then added and the resulting mixture is treated on attapulgite. The composition thus obtained contains 93.9% of inert liquid filler and the NCO/OH molar ratio is 1.0.

The viscosity at 60° C. is determined on a portion of this composition, this value being 5 mPa s. After 4 days at 60° C., the composition is totally crosslinked.

Another portion of the composition is placed in a leaktight cell for measuring the dissipation factor. After 8 days at 90°

C. and cooling, the tan δ at 20° C. - 50 Hz of the gel obtained is measured. A tan δ=0.00024 is found.

A composition is prepared containing DBS as liquid filler. 8.88 g of Tolonate are mixed, under a nitrogen atmosphere, with 936.2 g of DBS pretreated on attapulgite. 55.4 g of PolyBd and 10 mg/kg of DBTL are then added. The composition thus obtained contains 93.6% of inert liquid filler and the NCO/OH molar ratio is 1.0.

The viscosity at 60° C. is determined on a portion of this composition. It goes from 4 mpa s to 46 mPa s over 4 days. After 6 days at 90° C., the composition is totally crosslinked.

Another portion of the composition is placed in a leaktight cell for measuring the dissipation factor. After 8 days at 90° C. and cooling, the tan δ at 20° C. - 50 Hz of the gel obtained is measured. A tan δ=0.0079 is found.

A composition is prepared containing rapeseed oil as liquid filler. The rapeseed oil is pretreated on attapulgite. 11.3 g of Tolonate are mixed, under a nitrogen atmosphere, with 915 g of rapeseed oil. 73.7 g of PolyBd and 5 mg/kg of DBTL are then added. The composition thus obtained contains 91.5% of rapeseed oil. The NCO/OH molar ratio is 1.0.

The viscosity at 60° C. is determined on a portion of this composition. It goes from 34 mPa s to 92 mPa a over 2 days. After 8 days at 90° C., the composition is totally crosslinked.

Another portion of the composition is placed in a leaktight cell for measuring the dissipation factor. After 8 days at 90° C. and cooling, the tan δ at 20° C. and 50 Hz of the gel obtained is measured. A tan δ=0.00029 is found.

Properties of All-propylene-film Condensers Impregnated with Compositions According to the Invention In order to illustrate the excellent behavior of high-voltage insulations impregnated with compositions according to the invention, tests were carried out using condenser bobbins for DC voltage containing two layers of polypropylene films 13.6 μm in thickness.

Three series of 10 condensers were impregnated, on the one hand with Jarylec and on the other hand with two compositions according to the invention having the same NCO/OH molar ratio equal to 0.95 and consisting respectively of:
- 94% of Jarylec,
  5.20% of PolyBd and
  0.80% of Tolonate, referred to hereinbelow as composition X, and of
- 96% of Jarylec,
  3.47% of PolyBd and
  0.53% of Tolonate, referred to hereinbelow as composition Y.

The impregnation was performed under vacuum at room temperature. Immediately after impregnation, the experimental models were maintained for 6 days at 40° C. for the Jarylec and the composition Y and at 60° C. for the composition X. The experimental models were then left for 12 days at 90° C. for heat formation.

Two tests of lifetime at room temperature were then carried out, at a very high DC potential gradient (390 and 350 V/μm DC). The results obtained are presented in the graphs of FIGS. 4 and 5.

Figure 4:
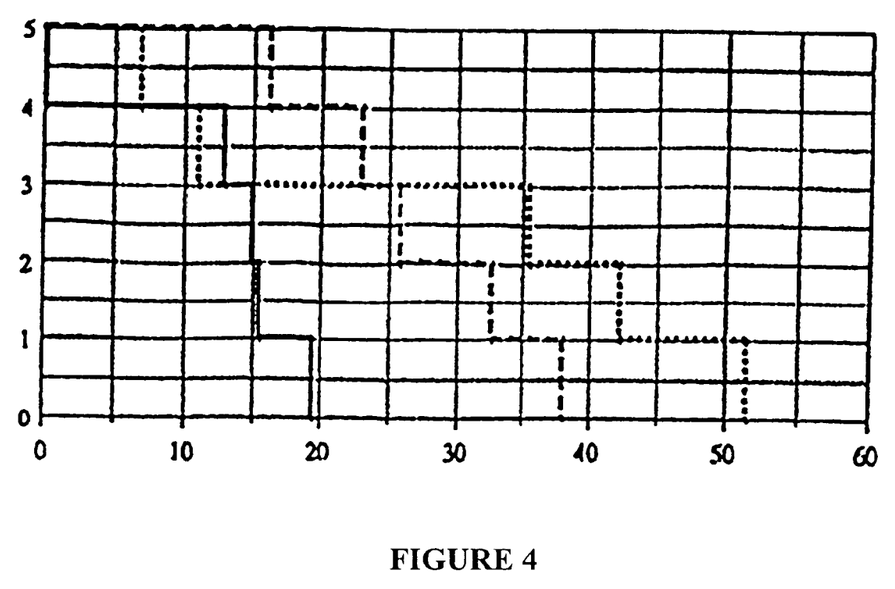
FIGS. 4 and 5 are graphs of condenser lifetimes.
Figure 5:
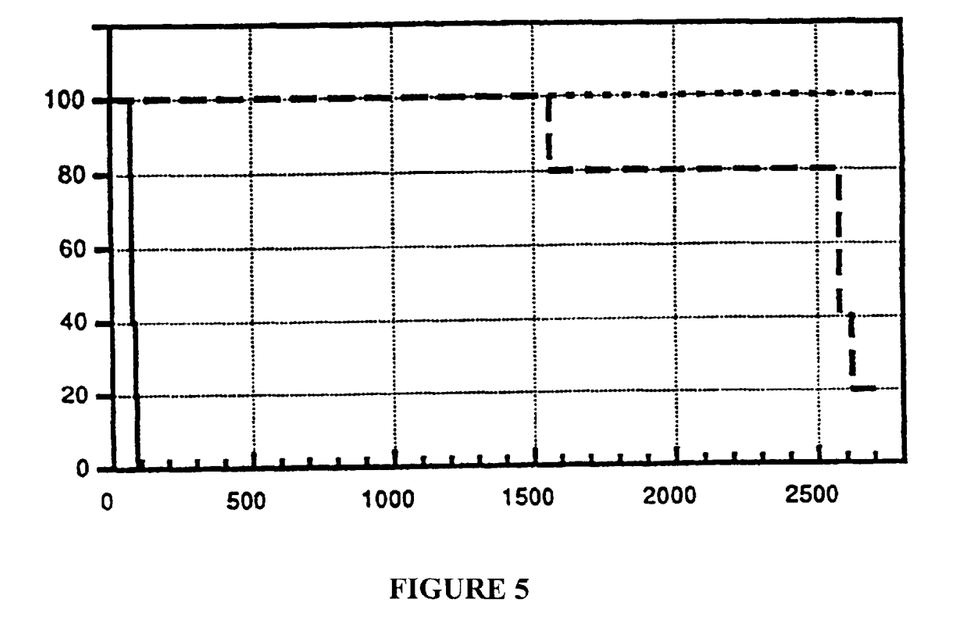

In these graphs, the number of surviving condensers is represented on the y-axis and the time in hours on the x-axis.

In this graph also, the curves represented are:
—Jarylec
---- composition X
.... composition Y The experimental models impregnated with compositions according to the invention led to lifetimes (time for breakdown of half of the condensers) which were from 70 to 240% higher than those obtained with Jarylec alone.

The preceding examples can be repeated with similar success by substituting the generically or specifically described reactants and/or operating conditions; of this invention for those used in the preceding examples.

The entire disclosure of all applications, patents and publications, cited above and below, and of corresponding French application 95/05989, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a solidifiable liquid crosslinkable impregnating dielectric composition consisting essentially of at least one polydiene polyal, at least one polyisocyanate and at least one chemically inert electrically insulating liquid, and optionally a catalyst and optionally one or more polyols having a low molar mass ranging from 50 to 800, the improvement wherein said polyisocyanate has a functionality greater than or equal to 2, and said chemically inert insulating liquid is present in an amount, by weight, of greater than 90% of the composition, in order to maintain a viscosity of less than 50 mPa s at an impregnation temperature of 20° C. to 90° C. for a period at least equal to 1 day, and in order to obtain a tangent δ (tan δ) at 20° C. and at 50 Hz, after complete crosslinking, of less than 0.02, said complete crosslinking permitting the conversion of the liquid dielectric composition to a solid.

2. A composition according to claim 1, wherein the functionality of the polyisocyanate is between 2.2 and 4.

3. A composition according to claim 1, wherein the amount of chemically inert insulating liquid is, by weight, between 92% and 96% of the composition.

4. A composition according to claim 1, wherein the impregnation temperature is between 40° C. and 90° C.

5. A composition according to claim 1, wherein the chemically inert insulating liquid is at least one member selected from the group consisting of alkylbenzenes, dielectric esters, alkylpolyaromatic compounds, alkyl phthalates, mixtures of benzyltoluenes and benzyl-benzyltoluenes, mixtures of mono- and bis-(methylbenzyl)xylenes, mixtures of benzyltoluenes and diphenylethane, and plant oils.

6. A composition according to claim 5, wherein the alkyl phthalate is dioctyl phthalate.

7. A composition according to claim 5, wherein the dielectric ester is dibutyl sebacate or dioctyl adipate.

8. A composition according to claim 5, wherein the plant oil is rapeseed oil.

9. A composition according to claim 5, wherein the chemically inert insulating liquid is a mixture of benzyltoluenes and benzyl-benzyltoluenes comprising from 50% to 90% by weight of benzyltoluenes (mixture of the o, m and p isomers) and from 50% to 10% by weight of benzyl-benzyltoluenes.

10. A composition according to claim 9, wherein the chemically inert insulating liquid is a mixture comprising 75% by weight of benzyltoluenes and 25% by weight of benzyl-benzyltoluenes.

11. A composition according to claim 1, wherein the chemically inert insulating liquid has a viscosity at 20° C. of not more than 100 mPa s, measured according to ASTM standard D445.

12. A composition according to claim 11, wherein the viscosity is between 4 and 30 mPa s.

13. A composition according to claim 1, wherein the polydiene polyol is a hydroxytelechelic conjugated diene oligomer.

14. A composition according to claim 13, wherein the conjugated diene is butadiene.

15. A composition according to claim 1, wherein the polydiene polyol has a number-average molar mass of not more than 7000.

16. A composition according to claim 15, wherein the number-average molar mass is between 1,000 and 3,000.

17. A composition according to claim 1, wherein the polydiene polyol has a functionality ranging from 1 to 5.

18. A composition according to claim 17, wherein the functionality is from 1.8 to 3.

19. A composition according to claim 1, wherein the polyisocyanate contains an isocyanurate ring in its molecule.

20. A composition according to claim 19, wherein the polyisocyanate is tris [1-(isocyanotomethyl)-1,3,3-trimethylcyclohexane] isocyanurate or the trimer of hexaaethylene diisocyanate.

21. A composition according to claim 1, wherein the polyisocyanate is an aromatic polyisocyanate.

22. A composition according to claim 21, wherein the polyisocyanate is 4,4'-diphenylmethane diisocyanate (MDI) or a polymeric MDI.

23. A composition according to claim 1, wherein the polyisocyanate is a cycloaliphatic polyisocyanate.

24. A composition according to claim 23, wherein the polyisocyanate is 4,4,'-dicyclohexylmethane diisocyanate.

25. A composition according to claim 1, further consisting essentially of one or more polyols having a low molar mass ranging from 50 to 800.

26. A composition according to claim 1, characterized in that the NCO/OH molar ratio is about 1.

27. A composition according to claim 26, wherein the NCO/OH molar ratio is between 0.85 and 1.15.

28. A composition according to claim 1, further consisting essentially of a catalyst.

29. A composition according to claim 1, wherein the impregnating temperature is room temperature.

30. A composition according to claim 1, immediately after production thereof, having a viscosity at 20° C. less than 50 mPa s.

31. A composition according to claim 1 wherein said tangent δ at 20° C. and at 50 Hz, after complete crosslinking is less than 0.01.

32. A process for the preparation of crosslinkable impregnating dielectric compositions according to claim 1, comprising preparing, firstly and separately, a mixture A, by dissolving one or more polydiene polyols in a chemically inert electrically insulating liquid, and a mixture B by dissolving one or more polyisocyanates in a chemically inert electrically insulating liquid; placing in contact, separately, each of the resultant mixtures A and B with an adsorbent earth at a temperature of between 20° C. and 80° C., said placing in contact being performed by adding the said adsorbent earth to the mixtures A and B, and the mixtures A and B containing the said adsorbent earth are then stirred separately for a period at least equal to 1 hour; the said adsorbent earth is then removed from the mixtures A and B and the resultant mixtures A and B are placed in contact after an optional addition of chemically inert insulating liquid.

33. A process according to claim 32, wherein the mixtures A and/or B are placed in contact with the adsorbent earth by circulating the mixtures A and/or B in separate columns packed with adsorbent earth.

34. A process according to claim 32, wherein the weight amounts of chemically inert insulating liquid in the mixtures A and/or B are at least equal to 40% of the mixtures A and B.

35. A process according to claim 34, wherein the weight amount of the insulating liquid is between 85% and 99.5% of the mixtures of A and B.

36. A process according to claims 32, the adsorbent earth is attapulgite.

37. A process according to claim 32, wherein the adsorbent earth is used, in the mixtures A and/or B, in a proportion of from 0.1 to 5 parts by weight per 100 parts by weight of mixture.

38. A method of improving insulation comprising impregnating a composition according to claim 1 into solid insulations contained in electrical appliances.

39. A method according to claim 38, wherein the electrical appliance is a condenser.

40. A method according to claim 38, wherein the electrical appliance is a high-voltage cable.

41. A high voltage cable produced by the method of claim 40.

42. Impregnated solid insulation prepared according to claim 38.

43. A condenser comprising at least one layer of polymer film impregnated with a composition according to one of claim 1.

* * * * *

UNITED STATES PATENT AND TRADEMARK OFFICE
CERTIFICATE OF CORRECTION

PATENT NO. : 6,316,542 B1
DATED : November 13, 2001
INVENTOR(S) : Berger et al.

Page 1 of 1

It is certified that error appears in the above-identified patent and that said Letters Patent is hereby corrected as shown below:

Column 10,
Line 18, change "polyal" to -- polyol --.

Column 11,
Lines 19-20 change "hexaaethylene" to -- hexamethylene --.

Signed and Sealed this

Twenty-first Day of May, 2002

Attest:

JAMES E. ROGAN
Director of the United States Patent and Trademark Office

Attesting Officer